United States Patent [19]

Yoshida et al.

[11] 4,186,423
[45] Jan. 29, 1980

[54] SOLID ELECTROLYTE CAPACITOR USING OXIDE OF RU, RH, RE, OS OR IR AS ELECTROLYTE

[75] Inventors: Akihiko Yoshida; Atsushi Nishino, both of Kadoma, Japan

[73] Assignee: Matsushita Electric Industrial Company, Limited, Kadoma, Japan

[21] Appl. No.: 838,236

[22] Filed: Sep. 30, 1977

[30] Foreign Application Priority Data

Oct. 1, 1976 [JP] Japan .............................. 51/118651
Dec. 20, 1976 [JP] Japan .............................. 51/154008
Jan. 7, 1977 [JP] Japan ................................ 52/932

[51] Int. Cl.$^2$ ........................ H01G 9/00; B01J 17/00
[52] U.S. Cl. ................................. 361/433; 29/570; 252/514
[58] Field of Search ..................... 361/433; 29/570; 252/514

[56] References Cited

U.S. PATENT DOCUMENTS

| | | | |
|---|---|---|---|
| 3,461,355 | 8/1969 | Fry | 361/433 |
| 3,531,693 | 9/1970 | Buice | 361/433 |
| 3,644,795 | 2/1972 | Taguchi | 361/433 |
| 3,711,385 | 1/1973 | Beer | 252/514 |
| 3,801,479 | 4/1974 | Nishino et al. | 361/433 |
| 3,843,400 | 10/1974 | Radford et al. | 252/514 |
| 3,881,957 | 5/1975 | Hausler | 361/433 |
| 3,920,452 | 11/1975 | Davies | 252/514 |
| 4,020,401 | 4/1977 | Cannon et al. | 29/570 |

FOREIGN PATENT DOCUMENTS

2146412  8/1972  France .................................. 361/433

*Primary Examiner*—Andrew J. James
*Attorney, Agent, or Firm*—Lowe, King, Price & Becker

[57] ABSTRACT

A solid electrolyte capacitor superior to a manganese dioxide capacitor and characterized by the use of an oxide of Ru, Rh, Re, Os or Ir either in place of or together with manganese dioxide. The newly utilized metal oxide is good at oxidizing ability and low in resistivity. A solid electrolyte layer comprising the newly utilized metal oxide is formed by pyrolysis of an aqueous solution comprising a soluble salt of the metal on an anodized valve metal. The solution may comprise manganese nitrate too.

14 Claims, 18 Drawing Figures

4,186,423

SOLID ELECTROLYTE CAPACITOR USING OXIDE OF RU, RH, RE, OS OR IR AS ELECTROLYTE

BACKGROUND OF THE INVENTION

This invention relates to a solid electrolyte capacitor of the type having a dielectric oxide film formed on the surface of an anode body of a valve metal and overlaid with a metal oxide electrolyte layer and a method of producing the same through pyrolysis of a metal salt solution to form the electrolyte layer.

Manganese dioxide or lead dioxide, particularly the former, is predominant as the solid electrolyte in conventional solid electrolyte capacitors of the type having an anode body of a valve metal such as tantalum or aluminum which is subjected to anodization to provide a dielectric oxide film thereon. One of primary reasons for the use of manganese dioxide being preferred is that manganese dioxide in the form of thin film can be formed relatively easily by thermal decomposition of an inexpensive manganese salt such as manganese nitrate as a solution with which the anodized valve body is wetted. As another reason, manganese dioxide has a resistivity low enough to be regarded as a semiconductive material and an oxidizing ability high enough to exhibit a so-called "healing" or "reforming" activity on the dielectric oxide film.

In a capacitor of the described type, the dielectric film formed by anodization of the valve metal body (by passing a DC current through the body in an electrolyte solution, as is well known) serves as the origin of the capacitance of the capacitor because it has a considerably high dielectric constant, 20-30 for $Ta_2O_5$, and a very small thickness ranging from about 50 to about 2000 A. However, it is practically impossible to form this film as an ideally homogeneous dielectric layer. The dielectric oxide film has a large number of microscopical faults which cause an increase in the leakage current of the capacitor. When these faults include extremely defective ones, the capacitor is liable to break down through concentration of excessively large currents at the most significantly defective points. When the dielectric oxide film is overlaid with a manganese dioxide solid electrolyte layer, oxygen ions are supplied from manganese dioxide to the faults in the dielectric oxide layer and heal the faults, particularly extremely defective ones either as a thermal or a electrochemical phenomenon. As a result, the leakage of current in the dielectric oxide film falls to a tolerable level. Such a property of the manganese dioxide layer during operation of the capacitor is commonly referred to as "self-healing". Thus, if it is intended to use a different metal oxide in place of manganese dioxide or lead dioxide from any reason, the metal oxide is required of having a self-healing property comparable to that of manganese dioxide in order to maintain the leakage current of the capacitor at a sufficiently low level and afford the capacitor a high breakdown strength. Besides, to be low in resistivity is a requisite to a solid electrolyte for a capacitor of the herein described type since the loss expressed by tan δ, a component of the series resistance of the capacitor, decreases as the resistivity of the electrolyte lowers.

From a consideration of either the self-healing property or electrical resistance, a solid electrolyte layer represented by a manganese dioxide layer must be formed so as to be in intimate contact with the dielectric oxide film over the entire surface area. This can be realized without much difficulty insofar as the dielectric oxide film is formed on a flat surface of the anode bobdy, but in practice the matter is not so simple. Most of currently produced tantalum capacitors of the described type utilize a sintered mass as their anode body. A sintered tantalum anode body is produced in various sizes usually ranging from about 0.01 to about 5 grams in weight, but commonly is of a porous or spongy structure having intercommunicating and microscopical voids or pores of about 5-10 μm in diameter. Upon anodization, a dielectric oxide film is formed on the wall of each of these pores. A great care is demanded, therefore, in forming a manganese dioxide layer on this type of anode body so as to fully and intimately cover the complicated dioxide films in the pores.

The most prevailing method of forming a manganese dioxide layer on a sintered and anodized valve metal body consists of a wetting step, wherein the body is immersed in an aqueous manganese nitrate solution to impregnate the pores in the body with the solution, and a heating step wherein the wetted body is heated in air so as to cause pyrolysis of the impregnated manganese nitrate into manganese dioxide. It is impossible to well cover the dielectric film with a sufficiently dense manganese dioxide layer by performing these two sequential steps only once. To take out or utilize a potential capacitance given by the dielectric oxide film on the pore walls to the extent of near 100%, it is necessary to repeat the wetting and heating steps five to seven times in succession so as to fill the pores with manganese dioxide as completely as possible, each time using a relatively dilute manganese nitrate solution. Repeating the pyrolysis operation over and over raises the cost of production and, as a matter of more concern, tends to impair the dielectric oxide film by the effect of heat.

To summarize, manganese dioxide is a fairly good solid electrolyte for tantalum or aluminum capacitors but yet is not fully satisfactory in its resistivity. Besides, a widely practiced pyrolysis method for the formation of a good manganese dioxide layer on a sintered anode body is deemed too troublesome and rather difficult to perform successfully.

SUMMARY OF THE INVENTION

It is an object of the present invention to provide a solid electrolyte capacitor which has an improved solid electrolyte layer in combination with a valve metal anode and is superior to conventional manganese dioxide or lead dioxide capacitors particularly in the capacitance utilization efficiency, loss and leakage current.

It is another object of the invention to provide an improved solid electrolyte capacitor in which microscopical pores of a valve metal anode body are well filled with a metal oxide solid electrolyte of a low resistivity.

It is a still another object of the invention to provide a solid electrolyte capacitor which utilizes manganese dioxide as a major component of its solid electrolyte but comprises another metal oxide as another component of the electrolyte for improvement on the properties of the electrolyte.

It is a still further object of the invention to provide a method of producing a solid electrolyte capacitor according to the invention, in which method an improved metal oxide solid electrolyte layer can be formed easily and successfully even when the capacitor utilizes a microscopically porous anode body.

A solid electrolyte capacitor according to the invention is fundamentally of a known construction and comprises an anode body of a valve metal, a dielectric oxide film formed on the anode body by anodization, a solid electrolyte layer laid intimately on the dielectric oxide film, and a cathode collector layer laid on the solid electrolyte layer. As an essential feature of this capacitor, the solid electrolyte layer comprises a metal selected from rutheniunm, rhodium, rhenium, osmium and iridium in an oxidized form.

The solid electrolyte may consist of an oxide of the aforementioned metal, preferably ruthenium, but in practice it is preferable that the solid electrolyte consists of the aforementioned metal, particularly ruthenium, in an oxidized state and manganese dioxide.

When the solid electrolyte includes manganese dioxide, the solid electrolyte layer may be formed entirely as an oxide system comprising both Mn and, for example, Ru. Alternatively, the solid electrolyte layer may have a multi-layered structure and consist of at least one layer comprising, for example, ruthenium in an oxidized form and at least one layer consisting of manganese dioxide.

In the production of a capacitor according to the invention, a solid electrolyte layer comprising the aforementioned metal in an oxidized form is formed by wetting an anodized valve metal anode body with an aqueous solution comprising a soluble salt of this metal and then heating the wetted anode body in air so as to cause pyrolytic decomposition of the soluble salt to an oxide of the metal.

In practice it is preferable to use an aqueous solution comprising $Mn^{2+}$, $NO_3^-$ and ions of the aforementioned metal such as ruthenium, whereby the subsequent pyrolysis results in the formation of a maganese dioxide layer containing, for example, ruthenium in an oxidized form. In the case where the aforementioned metal is ruthenium, the use of ruthenium trichloride is preferable but ruthenium nitrate is useful too. When ruthenium trichloride is used, it is preferable to remove chlorine ion from the solution by the addition of silver nitrate. Alternatively, ruthenium trichloride may be boiled in nitric acid as a preparatory step to the preparation of the solution.

DESCRIPTION OF PREFERRED EMBODIMENTS

Figure 1:
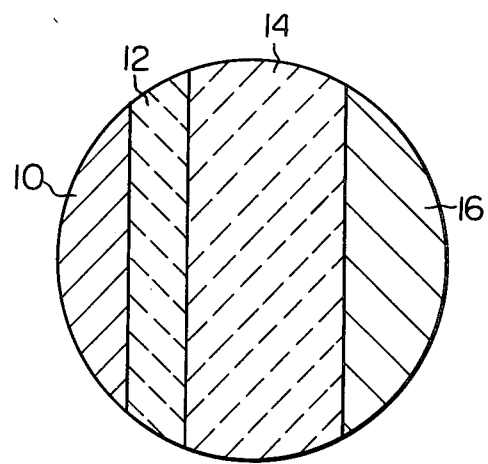
FIG. 1 is an enlarged sectional view of a fundamental part of a metal oxide solid electrolyte capacitor.
Figure 2:
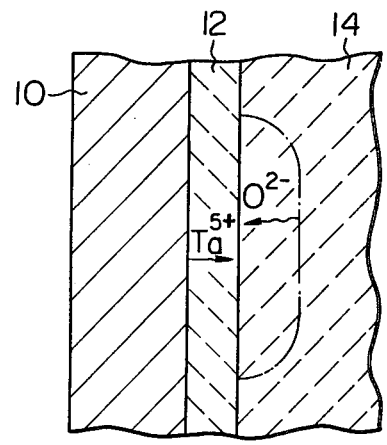
FIG. 2 is a similar view for the explanation of the self-healing property of the capacitor.

Referring to FIG. 1, a conventional manganges dioxide solid electrolyte capacitor is fundamentally made up of an anode body 10 of tantalum (or aluminum), a dielectric oxide ($Ta_2O_5$) film 12 formed on the surface of the anode body 10 by anodization, a manganese dioxide layer 14 laid on the dielectric oxide film 12, and a cathode collector layer 16. As mentioned hereinbefore, a capacitor according to the invention too is of this construction except for the replacement of the manganese dioxide layer 14 by a novel solid electrolyte. As illustrated in FIG. 2 and described hereinbefore, the manganese dioxide layer 14 supplies $O^{2-}$ ions to the dielectric oxide film 12 while $Ta^{5+}$ ions are supplied from the anode body 10 to the oxide film 12, with the result that faults in the oxide film 12 are healed. A solid electrolyte layer according to the invention also has the ability of supplying $O^{2-}$ ions sufficient to the accomplishment of self-healing.

The manganese dioxide layer 14 is formed in most cases by pyrolytic decomposition of an aqueous manganese nitrate solution but can be formed also by a different technique such as electrolysis of a manganese salt solution, vacuum evaporation or sputtering. The resistivity $\rho$ of the deposited manganese dioxide varies depending on the deposition method but generally ranges from $10^{-1}$ to $10^2$ $\Omega$cm. These resistivity values imply that manganese dioxide is a semiconductive material. Indeed $MnO_2$ behaves as an n-type semiconductor while $Mn_2O_3$ as a p-type semiconductor.

We have recognized that a group of metal oxides, namely, ruthenium oxide, rhodium oxide, rhenium oxide, osmium oxide and iridium oxide are low in resistivity $\rho$ than either manganese dioxide or lead dioxide and high enough in oxidizing power to use in place of manganese dioxide in the solid electrolyte capacitor of FIG. 1. Any of these low resistivity metal oxides can be used as a sole material of a solid electrolyte layer corresponding to the manganese dioxide layer 14 in FIG. 1, and it is also possible to use two or more of these oxides in various combinations. Furthermore, a solid electrolyte layer comprising manganese dioxide and one or more of these lower resistivity oxides is also within the scope of the invention. Among these low resistivity oxides, we prefer the use of ruthenium oxide $RuO_2$ because of its relatively low resistivity, less expensiveness than the others and ease in overlaying the dielectric oxide film 12 by a ruthenium oxide layer.

The resistivity $\rho$ of $RuO_2$ in the form of a thin layer deposited on a substrate varies depending on the deposition method but generally ranges from $10^{-5}$ to $10^{-2}$ $\Omega$cm. These resistivity values are several orders of magnitude below the values for $MnO_2$ and are comparable to resistivity values for metals.

Figure 3:
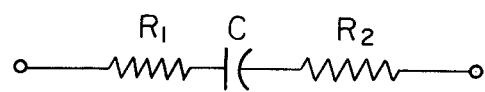
FIG. 3 shows an electrical circuit equivalent to the capacitor of FIG. 1.

A loss represented by tan $\delta$ of a solid electrolyte capacitor constructed as shown in FIG. 1 has dependence on the resistance of the solid electrolyte layer. This capacitor is represented by an equivalent circuit as shown in FIG. 3. The total resistance of the capacitor is dividable into two components: a first resistance component $R_1$ attributable to the dielectric oxide film and a second component $R_2$ attributable to the solid electrolyte and other elements such as leads. Then tan $\delta$ can be given by the following equation:

$$\tan \delta = \omega CR = \omega C(R_1 + R_2) = \omega CR_1 + \omega CR_2 \ldots \quad (1)$$

The term $\omega CR_1$ represents the resistance of the dielectric film and hence depends mainly on the anodization condition, so that this term has substantially no connection with the properties of the solid electrolyte. The other term $\omega CR_2$ depends on physical properties of the solid electrolyte layer such as the thickness, state of deposited particles and the resistivity $\rho$ of the electrolyte material. The use of a low resistivity electrolyte material is effective for decreasing the resistance $R_2$ and hence $\omega CR_2$, resulting in a decrease in tan $\delta$. Thus the use of $RuO_2$ as a solid electrolyte material in place of, or together with, $MnO_2$ makes it possible to obtain a solid electrolyte capacitor which exhibits a smaller tan $\delta$ than an equivalent manganese dioxide capacitor.

The oxidizing power or electro-forming ability of $RuO_2$ on a valve metal was confirmed by the following experiment.

Figure 4:
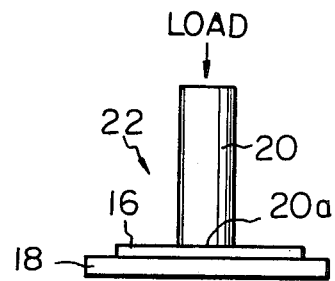
FIG. 4 shows an experimental assembly for examining the oxidizing ability of ruthenium oxide.
Figure 5:
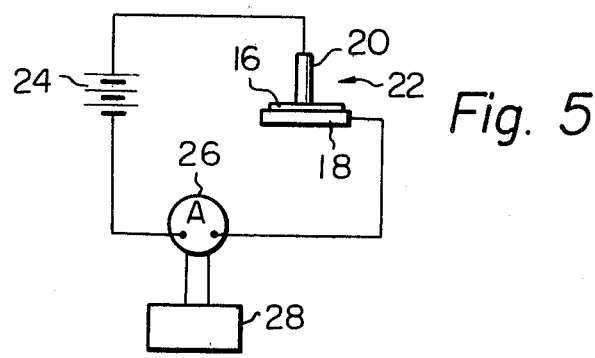
FIG. 5 shows an electrical connection for an experiment with the assembly of FIG. 4.
Figure 6:
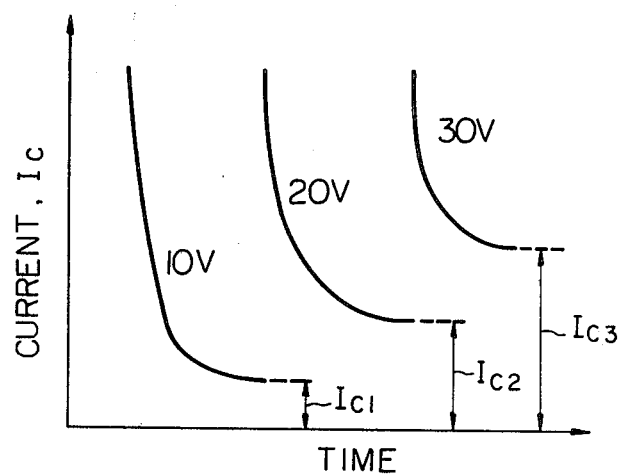
FIG. 6 presents electro-forming current curves for ruthenium oxide at various voltages.

Referring to FIG. 4, an about 500 $\mu$m thick film 16 of $RuO_2$ was deposited on a surface of a tantalum sheet 18 by pyrolytic decomposition of a ruthenium trichloride solution. A tantalum (capacitor grade) rod 20, which was 1 mm in diameter and had a mirror-finished end face 20a, was made to stand on the ruthenium oxide film 16 with application of a compressive load. As shown in FIG. 5, this assembly 22 was connected to a DC power supply 24 and an ampere meter 26 with the tantalum sheet 18 as the negative electrode and the tantalum rod 20 as the positive electrode in order to examine an anodization current passed through the circuit when a definite voltage is applied to the assembly 22. Indicated at 28 is a decoder for recording the current measured with the ampere meter 26. FIG. 6 shows the results of this experiment. When a DC voltage of 10 V was applied to the assembly 22, the current through the circuit exhibited an almost instantaneous and great rise but began to decrease after the lapse of a few seconds. While the impression of the fixed voltage was continued, the current continued to decrease until it reached a considerably low and constant value $I_{C1}$. A similar variation in the current occurred when a higher voltage, 20 V or 30 V, was applied to the assembly 22 except that the finally attained constant value for the current increased with increase in the impressed voltage as indicated at $I_{C2}$ for a voltage of 20 V and at $I_{C3}$ for 30 V in FIG. 6. The phenomenon observed in this experiment demonstrates that the application of a constant DC voltage across the ruthenium oxide layer 16 interposed between the tantalum members 18 and 20 causes the formation of an insulating layer, i.e. a tantalum oxide layer, on the end face 20a of the tantalum rod 20. The detected current $I_C$, which lowered with the lapse of time to approach a constant value, corresponds to a leakage current through the formed tantalum oxide layer. Upon application of a DC voltage to the assembly 22 in this circuit, the ruthenium oxide layer 16 supplies oxygen ion, upon application of a voltage thereto, to the tantalum rod 20 and there occurs oxidation of the end face 20a by a thermal or electrochemical stimulation. Such oxidation can be constructed as a solid phase anodic oxidation of tantalum caused by the contacted ruthenium oxide. It is understood, therefore, that ruthenium oxide has a high ability of electrochemically providing oxygen ions and exhibits a good self-healing property when used as a solid electrolyte in a tantalum (or aluminum) capacitor.

It will have been understood from the foregoing description that the use of ruthenium oxide as a solid electrolyte material is quite effective for obtaining a capacitor of a small tan $\delta$ and a small leakage current.

The advantage of ruthenium oxide over manganese dioxide in regard of the efficiency in utilizing a potential capacitance of a practical solid electrolyte capacitor will be described hereinafter.

Figure 7:
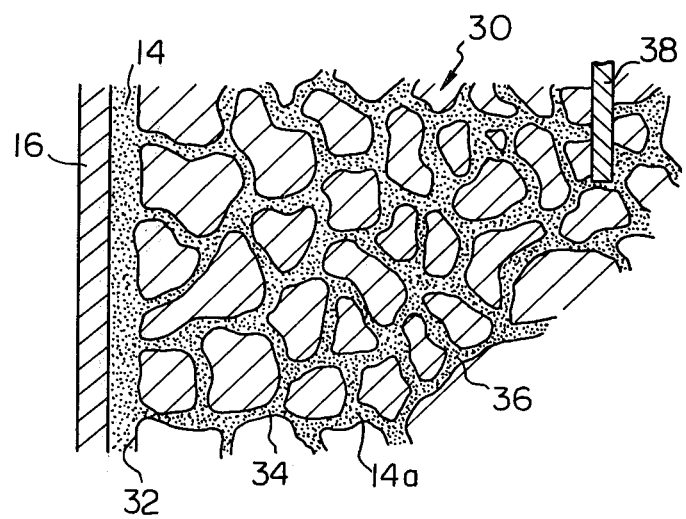
FIG. 7 is an enlarged sectional view of a fundamental part of a metal oxide solid electrolyte capacitor having a sintered mass as its anode body.

Referring to FIG. 7, a sintered mass 30 of tantalum which is widely used as an anode body of a manganese dioxide capacitor as mentioned hereinbefore has microscopical pores 34, 36 of about 5-10 $\mu$m in diameter (numeral 34 indicates pores located relatively close to the surface 32 of the sintered anode body 30, while numeral 36 indicates pores present in more interior regions). These pores 34, 36 are intercommunicating so that every pore 34, 36 leads to the surface 32 of the sintered anode body 30. Anodization of this tantalum body 30 results in that a tantalum oxide film (not illustrated) is formed on the wall of every pore 34, 36. In conventional manganese dioxide capacitors, the anodized body 30 is impregnated with a manganese nitrate solution and then subjected to heating for the decomposition of manganese nitrate to manganese dioxide thereby to lay the surface 32 with a manganese dioxide layer 14 and at the same time fill the pores 34, 36 with manganese dioxide as indicated at 14a. Thereafter the manganese dioxide layer 14 is coated with a cathode collector layer 16 by the application of, for example, colloidal carbon. Indicated at 38 is an anode lead. To take out or effectuate the capacitance provided by the dielectric oxide film in the interior pores 36, it is required that these pores 36 as well as the relatively exterior pores 34 be fully filled with the deposited manganese dioxide 14a. To meet this requirement to a practical satisfaction, the aforementioned impregnation and pyrolysis procedures must be repeated at least several times in succession. The time of the repetition varies depending on the shape and size of the anode body 30 and other factors. For example, these procedures need to be repeated at least 5-7 times when the anode body 30 is a cylinder 7 mm in diameter and 10 mm in height.

Figure 8:
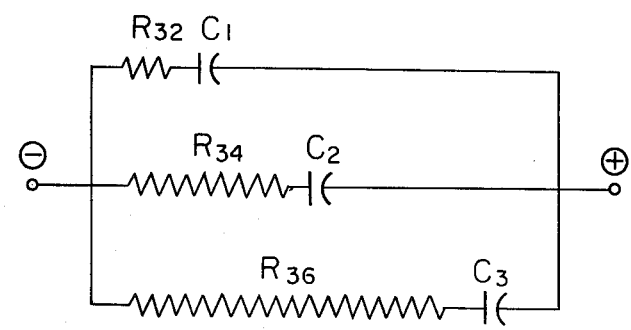
FIG. 8 shows an electrical circuit equivalent to the capacitor of FIG. 7.

The solid electrolyte capacitor of FIG. 7 is represented by an equivalent circuit shown in FIG. 8. In this circuit, $C_1$ and $R_{32}$ represent a capacitance and a resistance, respectively, on the surface 32 of the sintered body 30. Symbolized by $C_2$ is a capacitance given by the dielectric oxide film formed in the pores 34 located relatively close to the surface 32 and $R_{34}$ represents a resistance attributable to the manganese dioxide 14a present in these pores 34. Similarly, capacitance $C_3$ and resistance $R_{36}$ relate to the more interior pores 36. As can be understood, the capacitance $C_3$ cannot fully be effectuated unless the interior pores 36 are fully filled with the manganese dioxide 14a such that the resistance $R_{36}$ is sufficiently low. In practice, $R_{34}$ tends to be higher than $R_{32}$, and $R_{36}$ tends to be greatly higher than $R_{34}$. In the case of filling the pores 34, 36 with the manganese dioxide 14a by the decomposition of a manganese nitrate solution, it is very difficult to lower $R_{36}$ even to the level of $R_{34}$. This is the primary reason for the need for repeating many times the solution impregnation and pyrolytic decomposition procedures.

When the manganese dioxide 14, 14a in FIG. 7 is replaced by ruthenium oxide, which is inherently lower in resistivity, it becomes possible to effectuate the capacitances $C_2$ and $C_3$ in a higher percentage even if the pores 34, 36 are filled with ruthenium oxide only to such an extent as is insufficient in the case of manganese dioxide being used. In other words, a rate of capacitance effectuation attained by repeating more than several times the impregnation and pyrolytic decomposition procedures for the deposition of manganese dioxide is attainable by repeating similar procedures only far less times when manganese dioxide is replaced by ruthenium oxide (meaning the replacement of manganese nitrate by a ruthenium salt). When the pores 34, 36 are filled with ruthenium oxide by the decomposition of, for example, a ruthenium trichloride solution, it can be realized, without the need of repeating the impregnation and pyrolysis procedures more than five times (for the aforementioned) 7 mm wide and 10 mm long anode body), that both $R_{34}$ and $R_{36}$ are approximately equal to $R_{32}$.

Figure 9:
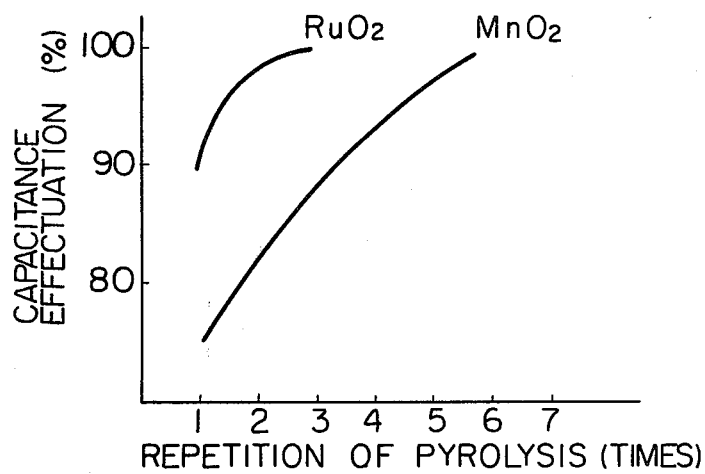
FIG. 9 is a graph showing the dependence of an effectual capacitance of the capacitor of FIG. 7 on the manner of a pyrolysis operation for forming a solid electrolyte layer in the production of the capacitor and the material of the solid electrolyte.

FIG. 9 presents an experimentally observed relationship between the time of repetition of the impregnation and pyrolysis procedures and the rate of capacitance effectuation for a manganese dioxide capacitor and a ruthenium oxide capacitor, both comprising the aforementioned 7×10 mm anode body of sintered tantalum. The "rate of capacitance effectuation" means the efficiency in utilizing a potential capacitance of the entire dielectric oxide film in a capacitor and is defined as follows.

Rate of capacitance effectuation(%)

$$= \frac{\text{(Practical Capacitance of Finished Capacitor)}}{\text{(Capacitance of Dielectric Oxide Film in Wet State)}} \times 100$$

As seen in FIG. 9, the use of ruthenium oxide in place of manganese dioxide brings about a remarkable enhancement of the capacitance effectuation rate and allows a great reduction in time of repetition of the pyrolytic decomposition operation for attaining nearly 100% effectuation of the capacitance.

Figure 10:
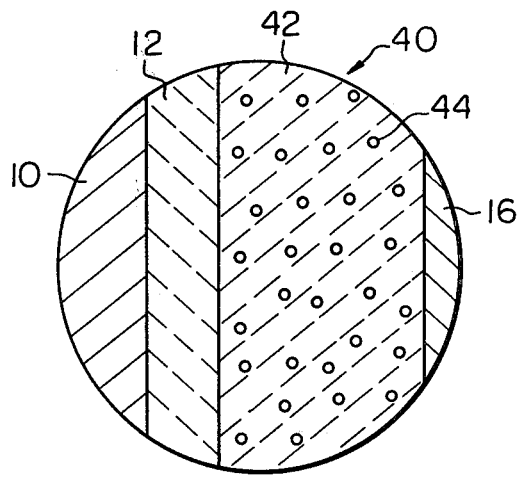
FIG. 10 is an enlarged sectional view of a fundamental part of a solid electrolyte capacitor as an embodiment of the invention.

The invention proposes to use ruthenium oxide not only singularly (as a sole component of a solid electrolyte layer) but also jointly with manganese dioxide. The latter method is embodied most conveniently by a solid electrolyte layer consisting of a homogeneous $MnO_2$—$RuO_2$ system. A solid electrolyte capacitor having such an oxide system is produced through the steps of wetting an anodized tantalum body with a solution of manganese nitrate and a soluble salt of ruthenium such as ruthenium trichloride or ruthenium nitrate and heating the wetted anode body in air to decompose the manganese and ruthenium salts. This capacitor is shown in FIG. 10, wherein a solid electrolyte layer 40 is illustrated for convenience as a manganese dioxide layer 42 containing dispersed therein ruthenium oxide 44, though in reality it is impossible to show this solid electrolyte layer 40 differently from the manganese dioxide layer 14 in FIG. 1.

Figure 11:
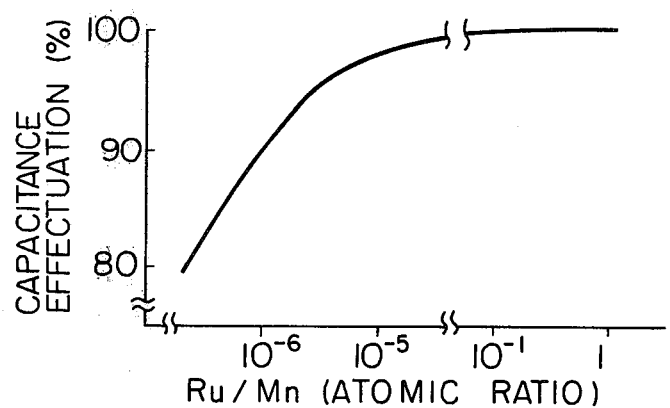
FIG. 11 is a graph showing the dependence of an effectual capacitance of the capacitor of FIG. 10 on the atomic ratio of Ru to Mn in the solid electrolyte.

For an $MnO_2$—$RuO_2$ electrolyte system, we have found an optimum range of the atomic ratio Ru/Mu. Referring to FIG. 11 (this graph represents the result of an experiment conducted by the use of an aqueous solution of $Mn(NO_3)_2$ and $RuCl_3$ and a sintered tantalum body 7 mm in diameter and 10 mm in height, repeating the pyrolysis operation three times), the capacitance effectuation rate for the capacitor of FIG. 10 increases as expected with increase in the atomic ratio R/Mn of the electrolyte 40 and reaches practically 100% when the ratio Ru/Mn is increased to $10^{-1} - 1$. Considering this result and that ruthenium is a costly material, the ratio Ru/Mn needs not to be made greater than 1, though a further decrease in the resistance of the electrolyte 40 will be caused by further increasing Ru/Mn. On the other hand, the effect of the presence of $RuO_2$ is insufficient when the ratio Ru/Mn is below $10^{-6}$. Accordingly the atomic ratio Ru/Mn for a $RuO_2$—$MnO_2$ electrolyte system is preferably made to range from $10^{-6}$ to 1, more preferably from $10^{-5}$ to 1.

The production of an Ru-containing solid electrolyte according to the invention will be described hereinafter more in detail.

Ruthenium trichloride is a stable and commercially available ruthenium salt and undergoes pyrolysis in the presence of oxygen to give ruthenium oxide with liberation of chlorine gas:

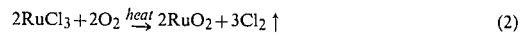

$$2RuCl_3 + 2O_2 \xrightarrow{heat} 2RuO_2 + 3Cl_2 \uparrow \qquad (2)$$

This pyrolysis was confirmed to proceed at temperatures above 320° C. by means of a thermobalance. It is desired, however, that a pyrolysis operation for forming a solid electrolyte layer on anodized tantalum be performed at a temperature as low as possible. We have confirmed that a solid electrolyte layer obtained through pyrolysis at 250°–300° C. of ruthenium trichloride in the form of an aqueous solution applied to anodized tantalum exhibits a very low resistivity and an excellent reforming ability, though this solid electrolyte comprises an incompletely oxidized intermediate such as $RuO_2.nH_2O$, and is comparable to a ruthenium oxide layer obtained by performing the pyrolysis at temperatures above 320° C.

In the case of using an aqueous solution containing both manganese nitrate and ruthenium trichloride for producing a Ru-containing manganese dioxide layer through pyrolysis, manganese dioxide which can be formed at about 130° C. exhibits a catalytic action on the decomposition of ruthenium trichloride. As a result, ruthenium oxide is formed in this case even when the pyrolysis is performed at temperatures between 250° and 300° C.

Accordingly the production of an excellent solid electrolyte layer comprising $RuO_2$ and/or $RuO_2.nH_2O$ can be put into practice without the need of employing such high pyrolysis temperatures as may cause deterioration of a tantalum oxide dielectric film.

The pyrolysis of ruthenium trichloride, however, involves another problem that chlorine formed according to Equation (2) may not completely be liberated as chlorine gas but may partly remain in the reaction system as Cl⁻ ion. The presence of a small amount of Cl⁻ ion in the solid electrolyte is not a matter of seriousness for low-tension grade (below 20 WV) capacitors but, for high-tension (above 50 WV) capacitors, becomes a serious cause for a substantial deterioration in the leakage current characteristic of the dielectric oxide film. Accordingly, the pyrolysis operation must be followed by a careful and repeated washing procedure with water to remove the retained Cl⁻ ion completely (Cl⁻ ion is far more difficult to remove than $NO_3^-$ ion derived from manganese nitrate). This causes much trouble to the production on industrial scale.

The incorporation of Cl⁻ ion in the product of the pyrolysis does not occur when ruthenium nitrate is used in place of ruthenium trichloride, but ruthenium nitrate is hardly avilable on the commercial market in a stable form.

We have devised an improved method of preparing ruthenium oxide from ruthenium trichloride. This method is characterized by the addition of a controlled amount of silver nitrate in the form of an aqueous solution to an aqueous solution of manganese nitrate and ruthenium trichloride. This causes precipitation of AgCl from the resulting solution, leaving $Ru^{3+}$ and $NO_3^-$ ions in the solution.

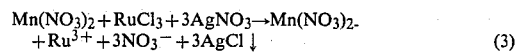

$$Mn(NO_3)_2 + RuCl_3 + 3AgNO_3 \rightarrow Mn(NO_3)_2 + Ru^{3+} + 3NO_3^- + 3AgCl \downarrow \quad (3)$$

The separation of filtration of this precipitate from the solution gives a liquid phase system $Mn(NO_3)_2$—$Ru^{3+}$—$NO_3^-$—$H_2O$. The pyrolysis of this aqueous solution gives a solid electrolyte system $MnO_2$—$RuO_2$ which is free from Cl⁻ ion through the following reaction.

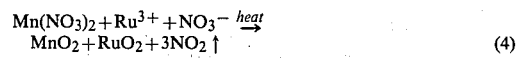

$$Mn(NO_3)_2 + Ru^{3+} + NO_3^- \xrightarrow{heat} MnO_2 + RuO_2 + 3NO_2 \uparrow \quad (4)$$

Figure 12:
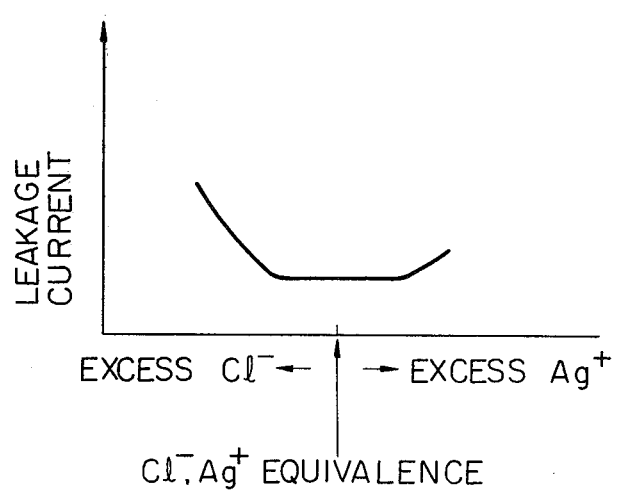
FIG. 12 is a graph showing the influence of chlorine ion in a solution used for forming the solid electrolyte layer in the production of a capacitor according to the invention on the leakage current of the capacitor.

In principle, silver nitrate must be added to the solution of manganese nitrate and ruthenium trichloride in the same equivalent weight as ruthenium trichloride contained in the solution for the achievement of a complete removal of Cl⁻ ion. We have experimentally confirmed, however, that such strictness is unnecessary in practical operation. Our experiments on capacitors having a $MnO_2$—$RuO_2$ layer formed on anodized tantalum by the improved method have revealed that errors to some extent in the quantity of the added silver nitrate do not substantially influence the leakage current characteristic of the product: leakage current of these capacitors minimized not only when the addition of $AgNO_3$ to the solution of $Mn(NO_3)_2$ and $RuCl_3$ was performed so as to realize the presence of Cl⁻ and Ag⁺ ions in exactly the same equivalent weights but also when Ag⁺ ion was somewhat in excess or in shortage as illustrated in FIG. 12. There is no need of accurately weighing a calculated amount of $AgNO_3$ to be added, and it suffices to determine the end point of the pouring of an aqueous solution of $AgNO_3$ into the $Mn(NO_3)_2$—$RuCl_3$ solution by visual observation of the formation of AgCl as white precipitate. It was conformed by quantitative analysis that the excess of either Ag⁺ ion or Cl⁻ ion is permissible insofar as the atomic ratio Cl/Mn is smaller than $10^{-2}$ for Cl⁻ ion and the atomic ratio Ag/Mn below $10^{-2}$ for Ag⁺ ion.

Figure 13:
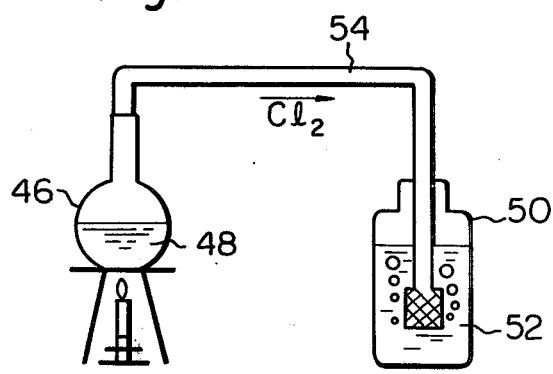
FIG. 13 shows a laboratory apparatus for treating ruthenium trichloride with nitric acid.
Figure 14:
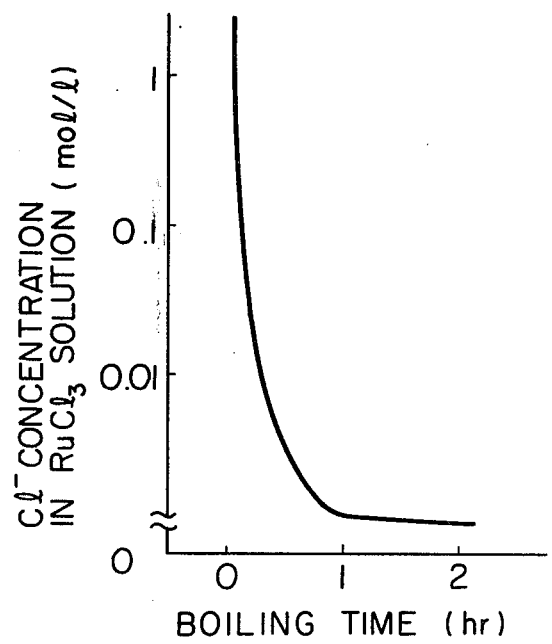
FIG. 14 is a graph showing a dechlorination effect of a treatment performed with the apparatus of FIG. 13.

Furthermore, this invention provides another method of preparing a Cl⁻-free aqueous solution of a ruthenium salt which readily undergoes pyrolysis to give ruthenium oxide. This method is characterized by boiling ruthenium trichloride in a concentrated nitric acid as a preparatory step to the preparation of the aqueous solution for the pyrolysis. FIG. 13 shows a laboratory apparatus for this boiling step for dechlorination. A flask 46 containing therein a solution 48 of ruthenium trichloride in concentrated nitric acid is connected to a gas absorption bottle 50 containing water 52 therein by a pipe 54. The solution 48 in the flask 46 is heated to boil. A gas evolved by the boiling flows into the bottle and is absorbed in the water 52. We have experimentally confirmed that this gas comprises chlorine. When the quantity of Cl⁻ ion in the solution 48 before boiling was 0.04 g (as the weight of AgCl) while the water 52 contained 0.00 g of Cl⁻, the boiling of the solution 48 for one hour gave the result that 0.00 g of Cl⁻ remained in the solution 48 while the water 52 turned into a solution containing 0.039 g of Cl⁻ (as the weight of AgCl). On the other hand, it was confirmed that substantially no chlorine gas is evolved by boiling an aqueous solution of ruthenium trichloride alone. FIG. 14 shows the lowering of Cl⁻ concentration of an 1 mol/liter aqueous solution of $RuCl_3$ added with concentrated nitric acid caused by boiling of the solution with respect to the amount of boiling time. As demonstrated by the graph of FIG. 14, a practically complete removal of Cl⁻ ion can be achieved by continuing the boiling for at least about 1 hr.

Probably nitroso ruthenium nitrite $Ru(NO_3)_3 \cdot NO$ is formed by the above described boiling of $RuCl_3$ in nitric acid because the solution 48 assumes a dark red color after boiling. The addition of this solution to a manganese nitrate solution gives a $Mn(NO_3)_2$—$Ru(NO_3)_3 \cdot NO$—$H_2O$ system which is of use for the production of a $MnO_2$—$RuO_2$ solid electrolyte by pyrolysis and does not contain Cl⁻ ion in such a large amount as may substantially affect the leakage current characteristic of the final product.

This method, as a method for the preparation of a substantially Cl⁻-free solution comprising a thermally decomposable ruthenium salt, is easy to industrially perform and deemed advantageous over the hereinbefore described silver chloride precipitation method.

As a still alternative way of obtaining such a solution, it is possible to use $RuO_2$ as the starting material by the aid of nitric acid. $RuO_2$ does not readily react with but dissolves in $HNO_3$, so that the addition of $RuO_2$ to a nitric acid solution gives a solution in which coexist $Ru^{4+}$ and/or $Ru^{3+}$ and $NO_3^-$. A mixture of this solution and an aqueous manganese nitrate solution is useful for the production of a chlorine-free $MnO_2$—$RuO_2$ system through pyrolysis.

All of the above described ruthenium salt solutions, including a mere solution of ruthenium trichloride in water, are useful for the production of a semiconductive oxide solid electrolyte comprising $RuO_2$ and/or $RuO_2 \cdot nH_2O$ on an anodized tantalum (or aluminum) body through pyrolysis at temperatures between 200° and 300° C. Irrespective of the kind of these ruthenium salt solutions, a capacitor comprising this solid electrolyte exhibits excellent characteristics such as small loss and current leakage and a very high rate of capacitance effectuation. Any of these ruthenium salt solutions exhibits a higher surface activity than a conventional manganese nitrate solution and hence can readily permeate deep into the micro-pores 34, 36 of the sintered body 30 in FIG. 7. An improved capacitance effectuation rate is derived partly from such a property of a ruthenium salt solution other than a low resistivity of ruthenium oxide. The choice of a ruthenium salt solution among the described ones may be made based on the shape, size and/or voltage rating of a capacitor to be produced and an intended manner of performing pyrolysis of the solution.

In place of an aqueous manganese nitrate solution to which a ruthenium salt solution is added, an aqueous slurry-like system expressed by $Mn(OH)_2$—$Mn(NO_3)_2$—$NH_4NO_3$—$H_2O$ may be used.

For conventional manganese dioxide solid electrolyte capacitors utilizing a sintered tantalum anode, there is a need of repeating many times the procedures of immersing the anode (after the formation of a dielectric oxide film) in a manganese nitrate solution and heating the wet anode to cause pyrolysis of the solution on the anode in order to fill in the pores of the anode with manganese dioxide. In many cases, a capacitor according to the invention too utilizes a sintered mass of tantalum as its anode body. Then it is usually impossible to obtain a capacitor of satisfactory properties by performing only once the immersion of the anode in a solution comprising a ruthenium salt and subsequent heating for pyrolysis. Since the use of both manganese dioxide and ruthenium oxide is preferred in the invention from the economical viewpoint and there is a need for a repetition of the wetting and heating of the sintered anode body, it is possible to utilize three types of solutions, one containing manganese nitrate but no ruthenium salt, one containing a ruthenium salt but no manganese salt and one containing both manganese nitrate and a ruthenium salt, in various combinations in performing the aforementioned repetition.

Figure 15:
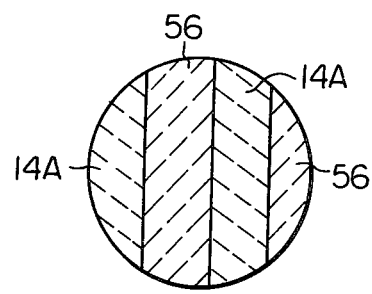
FIGS. 15–18 are enlarged sectional views of four kinds of multi-layered structures, respectively, all as embodiments of a solid electrolyte layer according to the invention.
Figure 16:
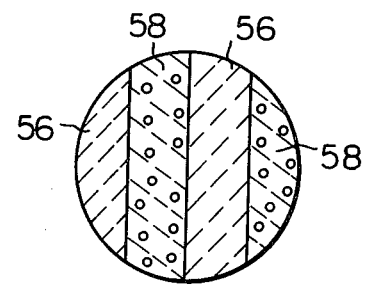
Figure 17:
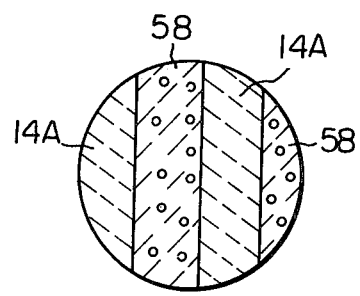
Figure 18:
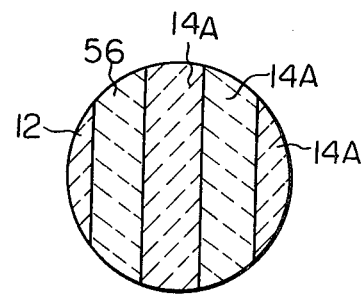

FIGS. 15–18 show four kinds of multi-layered structures each consisting of at least one Ru-containing oxide layer and at least one Ru-free manganese dioxide layer as examples of the structure of a solid electrolyte layer according to the invention. In the case of FIG. 15, manganese dioxide layers 14A containing no ruthenium and ruthenium oxide layers 56 containing no manganese oxide are laid alternately one upon another. As a modification, the two kinds of layers 14A and 56 may be arranged in a random order. In the case of FIG. 16, the ruthenium oxide layers 56 and another type of layers 58 consisting of manganese dioxide and ruthenium oxide (which may be in a hydrated form) are laid alternately one upon another. In FIG. 17, the manganese dioxide layers 14A and the ruthenium-containing manganese dioxide layers 58 are arranged alternately. Either of the structures of FIGS. 16 and 17 may be modified by the employment of a random arrangement of the two kinds of oxide layers. In the case of FIG. 18, a single layer 56 of ruthenium oxide is formed on the dielectric oxide film 12 at the first pyrolysis operation, and several manganese dioxide layers 14A are formed on the ruthenium oxide layer 56 in succession. The effectiveness of this structure too for an improvement on the utilization of a potential capacitance of a dielectric oxide film formed on a sintered anode body will be understood from the explanation given hereinbefore with reference to FIGS. 7 and 8. The ruthenium oxide layer 56 in FIG. 18 may be replaced by the ruthenium-containing manganese dioxide layer 58.

The invention will be further illustrated by the following examples.

EXAMPLE 1

A cylindrical body 2.3 mm in diameter and 3 mm in height produced by sintering of powdered tantalum was used as an anode body. Some pieces of such anode bodies were anodized in a phosphoric acid solution by the application of a voltage of 64 V to form a dielectric tantalum oxide film thereon and thereafter divided into four groups. The four groups of anodized tantalum bodies were wetted or impregnated with the following four kinds of solutions, respectively, and then each subjected to heating in air for accomplishing pyrolysis of the impregnated solution. For every group, the wetting and the heating were repeated three times. The heating was performed at somewhat different temperatures for the respective groups within the range of 200°–300° C.

Solution A: an aqueous $Mn(NO_3)_2$ solution with the addition of 10 Wt% of $RuCl_3$, followed by dechlorination using $AgNO_3$ Solution B: an aqueous $Mn(NO_3)_2$ solution added with 10 Wt% of $Ru(NO_3)_2$ Solution C: an aqueous $Mn(NO_3)_2$ solution containing 10 Wt% of $Ru(NO_3)_3 \cdot NO$ Solution D: an aqueous solution of $Mn(NO_3)_2$ The $Mn(NO_3)_2$ solution D had a specific gravity of 1.6, and this solution was utilized as the $Mn(NO_3)_2$ solution for each of the solutions A, B and C.

A cathode collector was provided to each of the products of these pyrolysis operations (having an oxide solid electrolyte of a three-layered structure) by the application of colloidal carbon and then silver paint, followed by soldering. The characteristics of the four groups of capacitors thus produced were as presented in Table 1.

Table 1

| Solution | Capacitance (μF) | capacitance Effectuation Rate (%) | tanδ (%) | Leakage Current at 16V (μA) | Frequency-Capacitance Characteristic |
|---|---|---|---|---|---|
| A | 10 | 98 | 1.0 | 0.01 | good |
| B | 10 | 98 | 1.0 | 0.01 | good |
| C | 10. | 98 | 1.0 | 0.01 | good |
| D | 9 | 90 | 2–3 | 0.05 | normal |

EXAMPLE 2

Cylindrical tantalum anode bodies, each 7 mm in diameter and 10 mm in height, were produced through sintering and anodized in a phosphoric acid solution by the application of a voltage of 250 V. These anode bodies were divided into four groups. The formation of solid electrolyte layers and the provision of cathode collectors for these four groups of anode bodies were performed in accordance with Example 1, using the four kinds of solutions A, B, C and D, except that the impregnation of each anode body with one of these solutions and subsequent heating for pyrolysis were repeated four times for every group. Table 2 presents the characteristics of the four groups of capacitors produced in this example.

Table 2

| Solution | Capacitance (μF) | Capacitance Effectuation Rate (%) | tanδ (%) | Leakage Current at 50 V (μA) | Frequency-Capacitance Characteristic |
|---|---|---|---|---|---|
| A | 22 | 98 | 1 | 0.1–0.5 | good |

Table 2-continued

| Solu-tion | Capaci-tance (μF) | Capacitance Effectuation Rate (%) | tanδ (%) | Leakage Current at 50 V (μA) | Frequency-Capacitance Characteristic |
|---|---|---|---|---|---|
| B | 22 | 98 | 1 | 0.1 | good |
| C | 22 | 98 | 1 | 0.1 | good |
| D | 20 | 90 | 2–3 | 0.5 | normal |

EXAMPLE 3

The cylindrical tantalum anode bodies of Example 1 were anodized in accordance with Example 1. These anode bodies were divided into three groups 3-1, 3-2 and 3-3, and the formation of solid electrolyte layers on the anodized bodies was accomplished in different manners for the respective groups.

3-1: The anode body was impregnated with the solution A (containing both $Mn(NO_3)_2$ and $RuCl_3$) of Example 1, followed by heating for pyrolysis (these procedures were not repeated). Thereafter the solution D (not containing Ru) of Example 1 was used in place of the solution A, and the wetting and heating for pyrolysis were carried out two times in succession.

3-2: The wetting of the anode bodies with the solution A and the subsequent heating were repeated three times with no additional procedures.

3-3: The wetting of the anode bodies with the solution D and the subsequent heating were repeated three times with no additional procedure.

The heating temperatures for pyrolysis in this example were regulated as in Example 1, and the provision of cathod collectors on the electrolyte layers was accomplished in accordance with Example 1. The characteristics of the three goups of capacitors produced in this example are presented in Table 3.

Table 3

| Group | Capa-citance (μF) | Capacitance Effectuation Rate (%) | tan (%) | Leakage Current at 16V (μA) | Frequency-Capacitance Characteristic |
|---|---|---|---|---|---|
| 3-1 | 10 | 98 | 1.0 | 0.01 | good |
| 3-2 | 10 | 98 | 1.0 | 0.01 | good |
| 3-3 | 9 | 90 | 2–3 | 0.05 | normal |

EXAMPLE 4

This example is identical with Example 3 in respect of the anode bodies and the anodizing condition. Thereafter the anode bodies were divided into three groups 4-1, 4-2 and 4-3 to be subjected to the formation of solid electrolyte layers by the use of three kinds of solutions, respectively.

4-1: An aqueous solution of $RuCl_3$ which had a concentration of $10^{-3}$ mol/liter.

4-2: The solution A of Example 1.

4-3: The solution D of Example 1.

For each group, the impregnation of the anodized bodies with one of these solutions and subsequent heating for pyrolysis were repeated three times. The provision of cathode collectors was accomplished according to Example 1. Table 4 presents the characteristics of capacitors produced in this example.

Table 4

| Group | Capa-citance (μF) | Capacitance Effectuation Rate (%) | tan (%) | Leakage Current at 16 V (μA) | Frequency-Capacitance Characteristic |
|---|---|---|---|---|---|
| 4-1 | 10 | 98 | 1 | 0.01 | good |
| 4-2 | 10 | 98 | 1 | 0.01 | good |
| 4-3 | 9 | 90 | 2–3 | 0.05 | normal |

What is claimed is:

1. A solid electrolyte capacitor comprising:
an anode body of a valve metal;
a dielectric oxide film formed on the surface of said anode body by anodization;
a solid electrolyte layer which is formed on said dielectric oxide film and comprises an oxide of a metal selected from the group consisting of ruthenium, rhodium, rhenium, osmium and iridium; and
a cathode collector layer formed on said solid electrolyte layer.

2. A capacitor as claimed in claim 1, wherein said solid electrolyte layer comprises manganese dioxide and said metal oxide.

3. A capacitor as claimed in claim 1, wherein said solid electrolyte layer has a multi-layered structure consisting of at least one layer of said metal oxide and at least one layer of manganese dioxide.

4. A capacitor as claimed in claim 3, wherein said at least one layer of said metal oxide is a single layer formed on and in direct contact with said dielectric oxide film.

5. A capacitor as claimed in claim 3, wherein said said metal oxide is ruthenium oxide.

6. A capacitor as claimed in claim 1, wherein said solid electrolyte layer has a multi-layered structure and includes at least one layer of manganese dioxide containing said metal oxide.

7. A capacitor as claimed in claim 6, wherein said solid electrolyte layer consists of at least one layer of said metal oxide and said at least one layer of manganese dioxide.

8. A capacitor as claimed in claim 7, wherein said at least one layer of said metal oxide is a single layer formed on and in direct contact with said dielectric oxide film.

9. A capacitor as claimed in claim 6, wherein said solid electrolyte layer consists of at least one layer consisting of manganese dioxide and said at least one layer of manganese dioxide containing said metal oxide.

10. A capacitor as claimed in claim 9, wherein said at least one layer of manganese dioxide containing said metal oxide is a single layer formed on and in direct contact with said dielectric oxide film.

11. A capacitor as claimed in claim 6, wherein said metal oxide is ruthenium oxide.

12. A capacitor as claimed in claim 11, wherein the atomic ratio of Ru to Mn in said at least one layer of manganese dioxide ranges from $10^{-6}$ to 1.

13. A capacitor as claimed in claim 1, wherein said solid electrolyte layer consists of ruthenium oxide.

14. A capacitor as claimed in claim 1, wherein said valve metal is tantalum.

* * * * *